Feb. 27, 1968  A. NEVULIS  3,370,601
VALVE FOR CONTROLLING THE RATE OF MOVEMENT
OF A FLUID POWERED MOTOR UNIT
Filed Jan. 2, 1964  2 Sheets-Sheet 1

INVENTOR.
ANTHONY NEVULIS
BY
Teare, Teller & Teare
ATTORNEYS

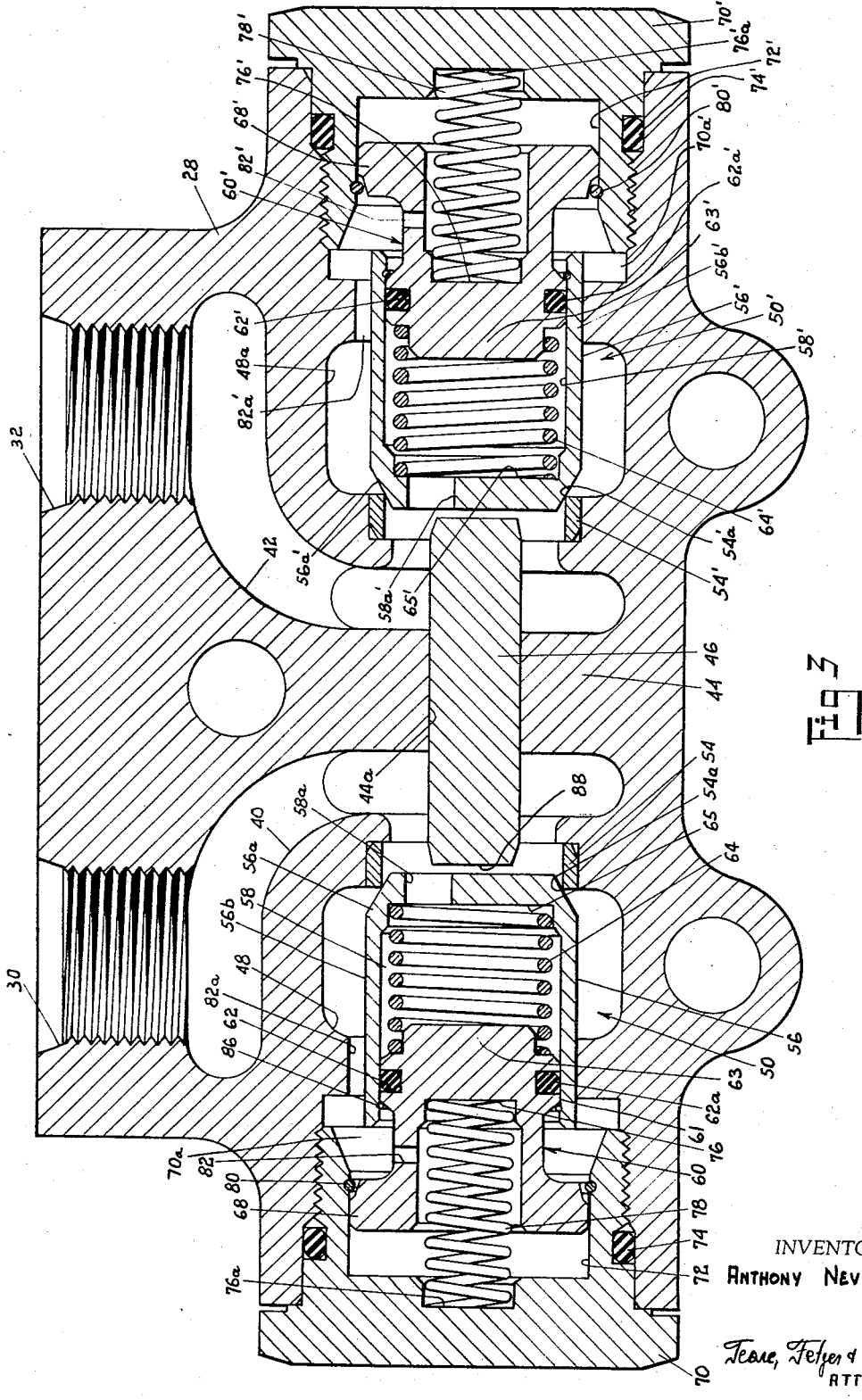

United States Patent Office 3,370,601
Patented Feb. 27, 1968

3,370,601
VALVE FOR CONTROLLING THE RATE OF MOVEMENT OF A FLUID POWERED MOTOR UNIT
Anthony Nevulis, Wickliffe, Ohio, assignor to The Ohio Brass Company, Mansfield, Ohio, a corporation of New Jersey
Filed Jan. 2, 1964, Ser. No. 335,166
13 Claims. (Cl. 137—87)

This invention relates in general to valve mechanism, and more particularly to a valve mechanism adapted for use in controlling movement or actuation of a fluid powered motor unit.

In fluid pressure control systems, it is conventional to control the application of pressurized fluid and the direction of flow of pressurized fluid to a fluid powered motor unit, by means of a spool or slide type control valve. A typical example is the use of a spool valve to control the movement of a reciprocal hydraulic ram or motor unit, which ram is used for instance in moving or controlling a pivotal boom or the like. Installations such as these are often found, for example, in utility type trucks wherein the trucks mount a boom for handling utility poles, equipment, and the like, and wherein the boom is pivotal in a generally vertical plane oftentimes through an angular range of 180° or more, and which boom may also be rotatable about a generally vertical axis. Check valves are usually incorporated in such control valve mechanisms to aid in preventing reverse flow of fluid from a motor unit in a predetermined control valve position, and to aid in providing for hydraulically locking the piston of the motor unit in selected position in its cylinder upon proper positioning of the spool of the control valve.

In the copending United States patent application, Ser. No. 249,358, filed Jan. 4, 1963 now United States Patent No. 3,207,178 by Anthony Nevulis et al., there is disclosed a novel control valve embodying power checking devices and adapted for use in effectively and smoothly controlling the movement of a fluid powered motor unit. The present invention provides a somewhat similar type of valve as that disclosed in said patent application, but with improved characteristics.

Accordingly, it is an object of the present invention to provide a novel control valve for use in optimumly controlling the movement of an associated fluid powered motor unit.

Another object of the invention is to provide a novel control valve which will be operative to lock without drift, fluid acting on a fluid powered motor unit, after the desired movement of the motor unit has been obtained.

Another object of the invention is to provide a novel poppet-type check valve mechanism for use with a directional control valve, and wherein said check valve mechanism includes a valve seat, a hollow poppet like valve member, a piston operating in said valve member and forming a balancing cylinder, resilient means coacting between said piston and said hollow poppet valve member, and wherein the effective area of the valve seat and the area of the sealing surface on the balancing cylinder are generally equal.

Other objects and advantages of the invention will be apparent from the following description taken in conjunction with the accompanying drawings wherein:

FIG. 3 is an enlarged vertical sectional view taken generally along the plane of line 3—3 of FIG. 2 looking in the direction of the arrows;

Figure 4:
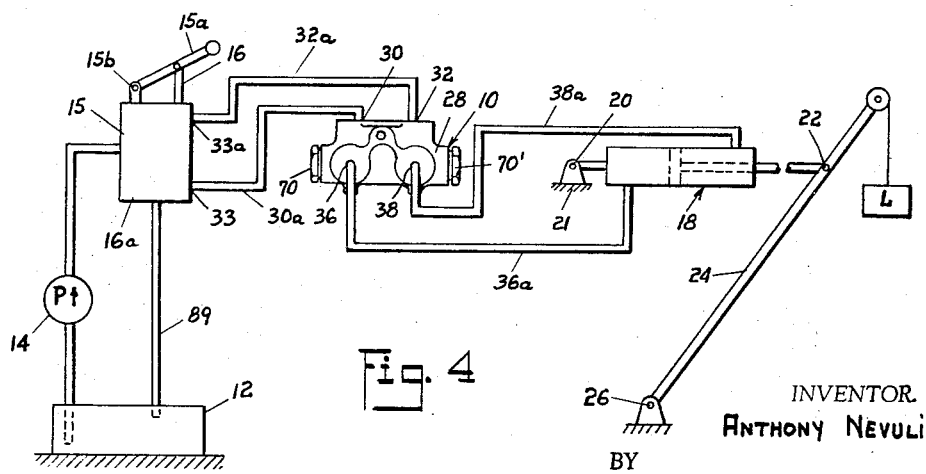
FIG. 4 is a diagrammatic illustration of a system embodying the check valve mechanism of the invention, and in conjunction with a conventional spool type, directional control valve and a reciprocal fluid powered motor unit for controlling a load.

Referring now again to the drawings, the reference numeral 10 designates a check valve assembly embodying the invention, and as shown in FIG. 4, such check valve may be connected into a hydraulic system comprising a reservoir 12, a pump 14, which may be of a constant volume output type, a directional control valve 15, which may be of the conventional, reciprocal, spring-loaded spool type, and which may have a handle 15a pivoted at 15b, and connected to the spool 16 of the valve, for moving the valve spool 16 lengthwise or axially in the directional control valve body 16a, and a reciprocal fluid powered motor unit 18. Motor unit 18 may be pivotally connected at 20 to a support 21, and pivotally connected as at 22 to a load supporting member 24. The load supporting member may be pivoted as at 26 to a support and may be represented in actual practice by, for instance, a boom member pivotally supported on a utility truck, for handling telephone poles and other equipment.

Figure 1:
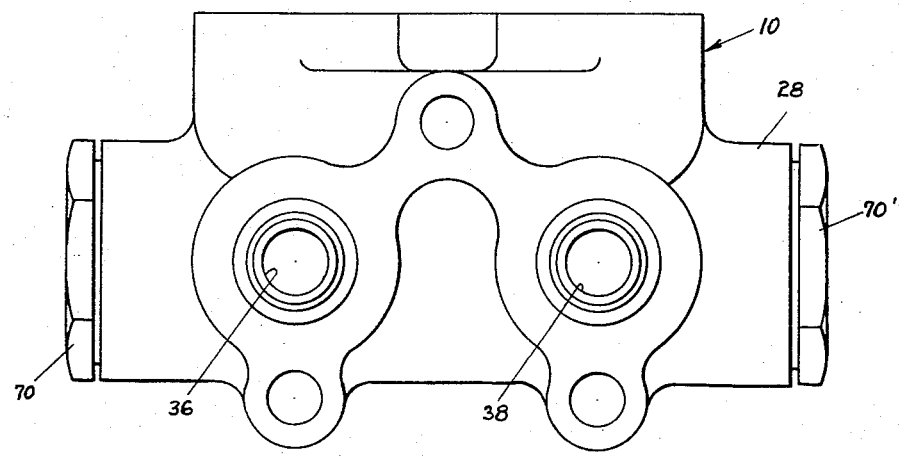
FIG. 1 is a side elevational view of a valve incorporating the check valve mechanism of the invention.
Figure 2:
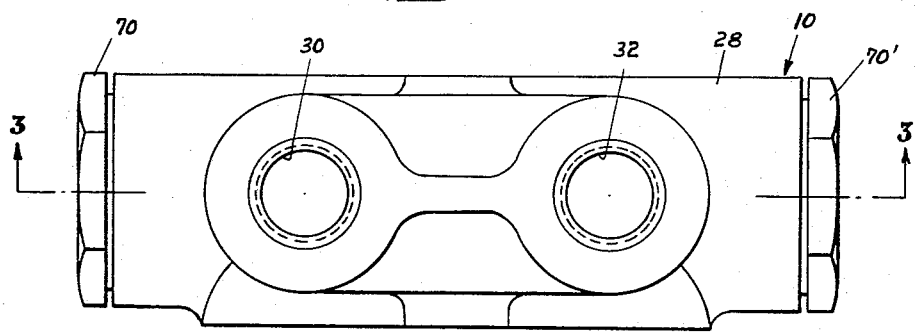
FIG. 2 is a top plan view of the valve of FIG. 1.

The valve 10 with which this invention is particularly concerned comprises a housing or body 28 (FIGS. 1, 2 and 3) which may have valve ports 30, 32, which are adapted for coupling as by means of fluid transmission lines 30a, 32a (FIG. 4) to the conventional distributing ports 33, 33a of the distributing valve 15. Valve 10 also has motor ports 36, 38, which are adapted for connection as by means of fluid transmission lines 36a and 38a to motor unit 18.

Referring now in particular to FIG. 3, valve port 30 communicates with a passageway or chamber 40 formed in the valve body, while valve port 32 communicates with a passageway or chamber 42 formed in the valve body, such passageways or chambers 40, 42 being divided as by means of body web 44, which in turn has a transverse opening 44a extending therethrough. Slidably mounted for axial movement in the opening 44a is a fluid actuated plunger member 46, which is preferably arranged with a relatively snug fit between the surface defining opening 44a and the external surface of the plunger 46 to prevent fluid leakage between chambers 40, 42. Body 28 of the valve member 10 is also provided with opposed recesses or chambers 48, 48a, each of which communicates with the respective passageway or chamber 40, 42, and in which in each of such chambers 48, 48a, is positioned a respective power checking valve device 50, 50'. Moreover, motor unit port 36 communicates with chamber 48, and port 38 communicates with chamber 48a. Check valve devices 50, 50' are adapted to coact with one another by means of the aforementioned reciprocal force transfer plunger 46. Since the power checking devices 50, 50' are identical in construction, only one will be described here in detail, with the parts of the other being designated by like reference numbers but having the prefix prime (') added thereto.

Power checking device 50 may comprise a circular valve seat 54 fitted or pressed into a complementary part of the respective chamber 48. Valve seat 54 at its outer edge provides a valve seating surface or edge 54a which is adapted for engagement with the poppet-like generally cylindrical valve member 56 of the respective checking device.

Valve member 56 may comprise a generally frustoconical head portion 56a adapted for engagement with the aforementioned edge 54a of the valve seat 54, and a sleevelike or cylindrical body portion 56b extending outwardly from the head portion 56a. It will be noted that the interior 58 of the valve member 56 defines a cylinder and with such cylinder chamber being connected by means of an opening 58a through the head portion 56a, with the respective chamber 40 in the valve body. Slidably mounted in cylinder chamber 58 of the valve member 56 is a piston 60 with a portion 61 thereof having a circumferential groove 62 therein, and receiving a sealing element 62a. The portion 61 has a boss portion 63, which is adapted to mount a spring member 64 extending between seat 65 in the valve member 56, and the piston 60, and to resist outward movement of the valve member 56 away from seat 54.

Piston 60 also includes a section 68 which is received in a detachable or threaded cap member 70, threaded into bore or chamber 70a, and which cap member defines a chamber 72 for reciprocal movement of piston section 68 therein. A sealing means, such as an O-ring 74, may be provided for sealing coaction between the cap 70 and the body 28 of the valve. Piston member 60 may have a recessed spring seat 76, and cap 70 may have a complementary recessed seat 76a, for receiving a compression spring 78 therebetween and resisting outward movement of the piston member 60 toward cap 70.

A retainer ring 80 which may be of metal, is provided in the cylinder 72 of cap 70, for limiting the inward movement of piston member 60 in a direction toward the plunger 46. It will also be seen that a passageway or port 82 is provided in member 60, communicating chamber 72 with chamber 70a and a passageway or slot 82a is provided in the valve body communicating chambers 70a and 48. Motor port 36 communicates with passageway or chamber 48 in the valve body, and is in communication with cylinder chamber 72 via port 82 and passageway or port 82a, while valve member 56 when it is in seated relation with valve seat 54 maintains motor port 36 out of communication with passageway 40 in the valve body.

A retaining ring 86 is also provided in the cylinder portion 58 of valve member 56, so as to limit the outward movement of the piston member 60 out of the cylinder portion 58 of the valve member 56. It will be noted that the area at sealing member 62a of piston member 60 and the area at the engagement 54a of the valve member 56 with valve seat 54, are generally equal, thereby providing for a check valve member (i.e. 56 or 56') that is generally pressure balanced so far as the fluid pressure occasioned by the load, as for Example L (FIG. 4) is concerned. Accordingly, once the fluid pressure in for instance passage 40 becomes the same as that of the pressure at motor port 36, the valve member 56 will be maintained in contact with the seating surface 54a due to the force of the resistance to compression of for instance the spring 78. A rise in the fluid pressure in the passage 40 once it overcomes the pre-load in spring 78 will cause the valve member 56 to disengage itself from its seating surface 54a and permit the flow of fluid from passageway 40 into passageway 48 and thence to the motor port 36.

Operation of the valve may be as follows:

When the operator actuates the valve spool 16 by axial movement thereof, and pressurizes, for instance port 33 of the directional control valve, thus transmitting such pressurized fluid via line 30a to valve port 30, pressurized fluid enters passageway 40 in the valve 10, and thus pressurizes the inside of cylinder chamber 58 up to seal 62a, and via port 58a in valve 56. Since the area at the sealing surface of seal 62a and the area at the sealing surface of the valve member 56 on valve seat 54 are generally equal, the mechanism is pressure balanced as concerns the force load from the motor unit through motor unit port 36, and the sealing force of valve member 56 against seat 54 as provided by spring 78. As the valve port 30 introduced pressure becomes equal to load imposed pressure on piston 60, the latter is urged against spring 78 and compresses such spring until such time as piston 60 engages the retainer ring 86. It will be seen that during this time the valve member 56 remains seated on valve seat 54. Thereafter, as the pressure from the valve port 30 increases, the valve member 56 and the piston 60 move together as a unit against the spring 78 to effect a load check action when the valve port 30 pressure exceeds the load pressure at motor port 36 plus the pre-load or bias of spring member 78.

Pressurized fluid from valve port 30 in passageway 40 also acts against the plunger member 46 or more particularly against surface 88 thereof, thus moving the plunger to the right (with reference to FIG. 3) whereupon it engages the valve member 56' of valve check mechanism 50' and moves the valve member 56', against the resistance to compression of spring 78', away from its seating relationship with its seat member 54'. Thus motor port 38 which communicates with chamber 48a is placed in communicating relation with chamber 42 upon outward movement of valve member 56' away from seat 54', thus permitting fluid ahead of the piston of the motor unit 18 to flow via line 38a and port 38 to chamber 48a, then through seat member 54', passageway 42, and then through valve port 32 to port 33a of directional control valve 15, and thence to reservoir via line 89.

It will be understood however, that in the event of load induced pressure at port 38, such load induced pressure acts to force the piston section 68' of piston 60' against the retaining ring 80', and since areas at 54a' and 62' are generally equal, the force from the plunger 46 merely moves the valve member 56' against spring 64' compressing the latter and thereby unseating the valve member 56' to allow fluid to flow from the motor port 38, through passage 48a and passage 42, and port 32, back to the directional control valve 15, which as aforementioned is open to tank.

While lowering a load (i.e. L) the pump 14 may be connected to valve port 36 by the directional control valve 15. Since the load itself generates pressure in motor port 38 as aforementioned, the motor port 36 is subjected to a relatively low pressure. Once the pressure in the supply passage 40 becomes sufficiently great to overcome the pre-load of the spring 78, the piston 60 and valve member 56 will move together outwardly as a unit against the spring 78 to effect load check action, thereby permitting pressurized fluid to flow from passage 40 and via motor port 36 and line 36a to the motor unit.

The high pressure fluid exiting from motor port 38 and thru chamber 48a and passage 42 due to the unseating of valve member 56' by plunger 46, will rush through passage 42, port 32, line 32a, and into port 33a of the directional control valve 15 whereby it will move in a conventional manner to line 89 as directed by the spool 16 of directional control valve 15. However, due to the natural limitations in flow occasioned by line 32a and the directional control valve 15, the pressure in passageway 42 will begin to rise. This rise in pressure acting on the cross sectional area of the force transfer plunger 46 will partly cancel the pressure force developed on the opposite end 88 of the transfer plunger due to the pressurized fluid in passage 40, and resulting in spring 64' tending to reseat the valve member 56', and with a corresponding reduction in the flow area past the sealing surface 54a'. This will then reduce the flow of fluid from motor port 38, reducing the pressure force in the line 32a and directional control valve 15, and therefore reducing the opposing force on the force transfer plunger 46. Accordingly the check valve mechanism 50' acting as a unit, will automatically maintain the pressure in the passage 42 proportional to the pressure in passage 40.

For any given set of conditions, this arrangement acting as a closed loop control will maintain a relatively constant pressure in the passage 42, and therefore the velocity of the load being lowered will be constant irrespective of the pressure in the exhaust port, as for example 38. If the pressure in the motor port 38 would rise or fall, the associated check valve 50' will automatically adjust its position to maintain a generally constant pressure in the passage 42, and therefore constant flow through the directional valve 15. A change in the pressure in the passage 40 will automatically change the pressure in the passage 42 and will change the flow through the directional valve 15.

It will be noted that once the full flow of the pump 14 is diverted into passage 40 and port 36, any further increase in the descending load velocity will automatically lower the pressure in passage 42, since the pump will not be capable of supplying this flow. This automatically, in the manner described above, would readjust the position of the check mechanism 50′, thereby tending to maintain the velocity of the load proportional to the maximum flow of the pump. This provides anti-cavitation protection, limiting the maximum speed of movement of the load to the output of the pump. Accordingly, by regulating the output of the pump with the spool 16 of the directional control valve in one of its extreme positions, the maximum speed of the descending load can be correspondingly regulated.

While the valve 10 with the power check mechanisms 50, 50′ have been illustrated as being disposed in a completely separate valve body in conjunction with a separate directional control valve 15, it will be understood that valves 15 and 10 could be combined into a single valve body arrangement. The separate arrangement facilitates the installation of the check valve mechanism generally adjacent the motor unit and aids in alleviating line losses. It will also be understood that while the device has been illustrated and described in connection with a double acting motor unit, that the invention could also be expeditiously utilized with a single acting motor unit or with double acting units where a load is supplied in one direction only.

From the foregoing discussion and accompanying drawings it will be seen that the invention provides a novel control valve for controlling the movement of a fluid powered motor unit, and one that is generally independent of the changes in force due to the loading on the motor unit, and a control valve which is of simplified construction and thus highly desirable from an economic standpoint.

The terms and expressions which have been used are used as terms of description and not of limitation, and there is no intention in the use of such terms and expressions of excluding any equivalents of the invention shown or described, or portions thereof, but it is recognized that various modifications are possible within the scope of the invention claimed.

I claim:

1. A valve for use in a fluid system for controlling the actuation of a fluid powered motor unit comprising, a housing having an inlet port and a first motor port and an exhaust port and a second motor port, said housing having a pair of chambers disposed in fluid communication with said inlet and exhaust ports, and a pair of passage means in fluid communication with said chambers and the respective motor ports, a power check valve mechanism disposed in each of said passage means to control fluid pressure between said motor ports and said inlet and exhaust ports, each of said valve mechanisms including a valve seat and a resiliently loaded, hollow valve member adapted for sealing engagement with the associated valve seat, and a resiliently loaded piston member disposed at one end for movement in each of the respective valve members, each of said valve members including an opening at its end adjacent its valve seat, one of said piston members is exposed to pressure from said inlet and the associated first motor port and the other piston member is exposed to pressure from said exhaust port and the associated second motor port, said openings in said valve members providing a fluid path for exposing said one piston to the inlet port pressure and said other piston to the exhaust port pressure, sealing means disposed in fluid sealing engagement between said piston members and the associated valve members, a plunger member disposed in fluid sealing relationship between said chambers for reciprocal movement for coacting engagement with one of the respective valve members, said plunger member at one end being exposed to pressure from said inlet port and at its other end being exposed to pressure from said second motor port, and retainer means disposed in each of said valve members for limiting movement of the associated piston members relative to the respective valve member, whereby the respective valve and associated piston members are caused to move, as a unit, in a direction away from the associated valve seats in response to a pressure at said inlet port which acts to unseat the valve member which is in communication with the inlet port and its associated first motor port and which acts on said plunger member to unseat the other valve member which is in communication with the exhaust port and its associated second motor port for maintaining the pressure in one of said chambers substantially proportional to the pressure in the other of said chambers.

2. A valve in accordance with claim 1, wherein said resilient loading for said valve members comprises a first spring means disposed in each of said valve members in coacting engagement with the associated piston members for resisting outward movement of the respective piston members in a direction away from the associated valve seats.

3. A valve in accordance with claim 2, wherein said resilient loading for said piston members comprises a second spring means disposed between each of said piston members and the housing for resisting outward movement of the respective piston members and associated valve members in a direction away from the associated valve seats.

4. A valve in accordance with claim 3, wherein the respective valve members and associated piston members move together, as a unit, when the pressure at the inlet port exceeds the pressure at the associated motor ports plus the pre-load imparted by the associated second spring means.

5. A valve in accordance with claim 1, wherein each of said piston members includes an outwardly extending mounting section disposed for sliding movement in the associated passage means, and said piston members each having an opening adjacent said mounting section for communicating the respective chambers with the associated motor ports.

6. A valve in accordance with claim 5, wherein said retainer means includes a ring-like retainer element disposed in each of said passage means for engageable coaction with the respective of said mounting sections for limiting inward movement of the respective piston members in a direction toward the associated valve seats.

7. A valve in accordance with claim 1, wherein the cross sectional area of said sealing means is substantially the same as the sealing area defined by sealing engagement of the respective valve members with the associated valve seats.

8. A valve for use in a fluid pressure system comprising, a housing having a first port adapted for fluid communication with a first motor port and a second port adapted for fluid communication with a second motor port, said ports being selectively reversible for use as inlet or outlet ports, said housing having a first pair of chambers disposed in fluid communication with said first and second ports and a second pair of chambers disposed in fluid communication with said first pair of chambers and with said first and second motor ports, a power check valve mechanism disposed in each of the chambers of said second pair adapted to control the flow of fluid pressure between said first and second ports and the respective motor ports, each valve mechanism including a valve seat disposed in each one of said second pair chambers and a resiliently biased, hollow valve member movable in each of said second pair of chambers and adapted for seating engagement with its associated valve seat, and a resiliently biased piston member disposed for axial movement in each said valve member, each of said valve members including an opening at one end communicating with the interior thereof for exposing the respective piston members to fluid pressure from said first pair of chambers, a plunger member disposed in fluid sealing relationship between said first pair of chambers for reciprocal coacting engagement with the one or the other respective valve members, but only when the chamber in which said one of the valve members is located comprises an exhaust chamber, and each of said valve members including retainer means for limiting movement of the respective piston member relative to the valve member upon the introduction of fluid pressure into said valve member via said opening and to cause movement of the piston and valve members, as a unit, upon a pressure build-up in the respective chamber comprising the inlet to the valve.

9. A valve in accordance with claim 8, including sealing means disposed in fluid sealing engagement between the respective piston members and each of the respective valve members.

10. A valve in accordance with claim 8, wherein each piston member includes a head portion adapted for engagement with said valve member and a mounting section, said mounting section being received in a hollow cap member attached to said housing, said cap member defining a chamber for reciprocal movement of said piston member therein.

11. A valve in accordance with claim 10, wherein said housing includes a passageway communicating each of the chambers of said second pair with the respective chambers defined by said cap member.

12. A valve in accordance with claim 10, wherein the resilient biasing means acting on said valve members and said piston members includes a recessed seat in the mounting portion of said piston members, a first spring element disposed in said valve members in biasing engagement with said piston members, and a second spring element in said recessed seats of said piston members for biasing engagement with said cap members.

13. A valve in accordance with claim 8, wherein said valve, piston and plunger members are of a generally cylindrical construction, and said plunger member being disposed in axial, generally concentric relation with respect to said valve and piston members.

References Cited

UNITED STATES PATENTS

| | | | |
|---|---|---|---|
| 2,778,378 | 1/1957 | Presnell | 91—420 X |
| 2,368,852 | 2/1945 | Lauck | 137—87 |
| 3,198,088 | 8/1965 | Johnson | 91—420 |
| 3,204,657 | 9/1965 | Boyd | 137—505.18 X |

WILLIAM F. O'DEA, *Primary Examiner.*

D. J. ZOBKIW, *Assistant Examiner.*